United States Patent
Bell et al.

(10) Patent No.: US 10,742,814 B1
(45) Date of Patent: **\*Aug. 11, 2020**

(54) WORKFLOW BASED COMMUNICATIONS ROUTING

(71) Applicant: Amazon Technologies, Inc., Seattle, WA (US)

(72) Inventors: Kristopher William Bell, Issaquah, WA (US); Vikas Seshagiri Rao Bhardwaj, Seattle, WA (US); Ariel Grob Dos Santos, Seattle, WA (US); Kathleen Ann Mitchell Gavenman, Seattle, WA (US); Gunashekar Jayaraman, Redmond, WA (US); Farrukh Raza, Redmond, WA (US); Andrew Gardiner Sutherland, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,820

(22) Filed: Aug. 28, 2019

Related U.S. Application Data (63) Continuation of application No. 15/340,022, filed on Nov. 1, 2016, now Pat. No. 10,469,665.

(51) Int. Cl.
| | |
|---|---|
| *H04M 3/00* | (2006.01) |
| *H04M 3/51* | (2006.01) |
| *H04L 12/58* | (2006.01) |
| *G06F 3/0481* | (2013.01) |
| *H04M 3/523* | (2006.01) |
| *H04L 29/08* | (2006.01) |

(Continued)

(52) U.S. Cl.
CPC ........ *H04M 3/5191* (2013.01); *G06F 3/0481* (2013.01); *G06F 40/205* (2020.01); *G06F 40/35* (2020.01); *H04L 51/02* (2013.01); *H04L 51/046* (2013.01); *H04L 67/306* (2013.01); *H04M 3/5233* (2013.01)

(58) Field of Classification Search
CPC ............................. H04M 3/5191; G06F 40/35
USPC ....... 379/265.01–265.14, 265.01–266.1, 309
See application file for complete search history.

(56) References Cited

U.S. PATENT DOCUMENTS

| | | | |
|---|---|---|---|
| 8,589,407 | B2 | 11/2013 | Bhatia |
| 8,612,233 | B2 | 12/2013 | Anand et al. |

(Continued)

OTHER PUBLICATIONS

U.S. Appl. No. 14/974,501, filed Dec. 18, 2015, Advisory Office Action dated May 15, 2017.

(Continued)

*Primary Examiner* — William J Deane, Jr.
(74) *Attorney, Agent, or Firm* — Thomas Horstemeyer, LLP (57) ABSTRACT

Disclosed are various embodiments for routing communications to service agents based on a workflow. A computing device identifies a user intent object corresponding to a user interaction with the computing device. The computing device then generates a search criterion based on the identified user intent object and uses the search criterion for identifying the user intent in subsequent user interactions. After identifying the user intent, the computing device can identify a workflow corresponding to the user intent object. Later, the computing device can process one or more tasks associated with the workflow.

20 Claims, 6 Drawing Sheets

(51) Int. Cl.
*G06F 40/35* (2020.01)
*G06F 40/205* (2020.01)

(56) References Cited

U.S. PATENT DOCUMENTS

| | | | |
|---|---|---|---|
| 8,792,631 | B2 | 7/2014 | Addair |
| 9,785,715 | B1 | 10/2017 | Busey et al. |
| 9,800,727 | B1* | 10/2017 | Chakrabarty ....... H04M 3/5232 |
| 10,200,334 | B1* | 2/2019 | Cordell ................ H04L 67/26 |
| 2002/0119793 | A1 | 8/2002 | Hronek et al. |
| 2005/0080930 | A1 | 4/2005 | Joseph |
| 2006/0080130 | A1 | 4/2006 | Choksi |
| 2006/0248474 | A1* | 11/2006 | Kimotsuki ............ G06F 3/0482 715/810 |
| 2008/0049929 | A1* | 2/2008 | Miloslavsky ........ G06Q 10/107 379/265.12 |
| 2008/0300053 | A1 | 12/2008 | Muller |
| 2009/0132442 | A1 | 5/2009 | Subramaniam et al. |
| 2010/0142698 | A1 | 6/2010 | Spottiswoode et al. |
| 2011/0243310 | A1* | 10/2011 | Franklin-Barr ......... H04M 1/64 379/88.01 |
| 2012/0041903 | A1 | 2/2012 | Beilby et al. |
| 2012/0271643 | A1* | 10/2012 | Da Palma ............... G10L 15/22 704/275 |
| 2012/0309436 | A1 | 12/2012 | Lan et al. |
| 2014/0044243 | A1 | 2/2014 | Monegan et al. |
| 2014/0067375 | A1* | 3/2014 | Wooters .................. G06F 17/28 704/9 |
| 2014/0164302 | A1 | 6/2014 | Di Fabbrizio et al. |
| 2014/0222503 | A1 | 8/2014 | Vijayaraghavan et al. |
| 2014/0280612 | A1 | 9/2014 | Beslic et al. |
| 2014/0365594 | A1 | 12/2014 | Miner et al. |
| 2015/0006632 | A1 | 1/2015 | Tomkins et al. |
| 2015/0073868 | A1 | 3/2015 | Garman |
| 2015/0348173 | A1 | 12/2015 | Gillen |
| 2016/0044083 | A1 | 2/2016 | Galloway et al. |
| 2016/0055563 | A1 | 2/2016 | Grandhi |
| 2016/0063993 | A1 | 3/2016 | Dolan et al. |
| 2016/0078512 | A1 | 3/2016 | Yopp et al. |
| 2016/0163311 | A1 | 6/2016 | Crook et al. |
| 2016/0173424 | A1 | 6/2016 | Fuhrmann |
| 2016/0173627 | A1 | 6/2016 | Herling et al. |
| 2016/0196491 | A1 | 7/2016 | Chandrasekaran et al. |
| 2016/0234245 | A1 | 8/2016 | Chapman |
| 2016/0260029 | A1* | 9/2016 | Gelfenbeyn ............ G06N 5/022 |
| 2016/0316059 | A1* | 10/2016 | Nuta ...................... G10L 15/063 |
| 2016/0322044 | A1 | 11/2016 | Jung et al. |
| 2016/0379129 | A1 | 12/2016 | Assem et al. |
| 2017/0006161 | A9* | 1/2017 | Riahi ..................... G06Q 30/02 |
| 2017/0032783 | A1 | 2/2017 | Lord et al. |
| 2017/0048170 | A1 | 2/2017 | Smullen et al. |
| 2017/0118336 | A1 | 4/2017 | Tapuhi et al. |
| 2017/0132019 | A1 | 5/2017 | Karashchuk et al. |
| 2017/0139802 | A1 | 5/2017 | Hajiyev et al. |
| 2017/0195495 | A1* | 7/2017 | Deora ............... H04M 3/42042 |
| 2017/0228771 | A1 | 8/2017 | Singh et al. |
| 2017/0230312 | A1 | 8/2017 | Barrett et al. |
| 2018/0083894 | A1 | 3/2018 | Fung et al. |
| 2018/0090135 | A1* | 3/2018 | Schlesinger ............ G10L 15/22 |

OTHER PUBLICATIONS

U.S. Appl. No. 14/974,501, filed Dec. 18, 2015, Final Office Action dated Mar. 17, 2017.
U.S. Appl. No. 14/974,501, filed Dec. 18, 2015, Non-Final Office Action dated Jul. 7, 2017.
U.S. Appl. No. 14/974,501, filed Dec. 18, 2015, Non-Final Office Action dated Jul. 27, 2016.
U.S. Appl. No. 14/974,501, filed Dec. 18, 2015, Notice of Allowance dated Mar. 22, 2018.
U.S. Appl. No. 14/974,501, filed Dec. 18, 2015, Response to Final Office Action dated Mar. 17, 2017.
U.S. Appl. No. 14/974,501, filed Dec. 18, 2015, Response to Non-Final Office Action dated Jul. 7, 2017.
U.S. Appl. No. 14/974,501, filed Dec. 18, 2015, Response to Non-Final Office Action dated Jul. 27, 2016.
U.S. Appl. No. 15/234,200, filed Aug. 11, 2016, Final Office Action dated Nov. 1, 2018.
U.S. Appl. No. 15/234,200, filed Aug. 11, 2016, Non-Final Office Action dated Mar. 8, 2018.
U.S. Appl. No. 15/234,200, filed Aug. 11, 2016, Notice of Allowance dated Apr. 3, 2019.
U.S. Appl. No. 15/336,934, filed Oct. 28, 2016, Final Office Action dated Jan. 24, 2019.
U.S. Appl. No. 15/336,934, filed Oct. 28, 2016, Notice of Allowance dated Jul. 16, 2019.
U.S. Appl. No. 15/336,934, filed Oct. 28, 2018, Non-Final Office Action dated Jul. 12, 2018.
U.S. Appl. No. 15/340,022, filed Nov. 1, 2016, Final Office Action dated Jun. 29, 2018.
U.S. Appl. No. 15/340,022, filed Nov. 1, 2016, Non-Final Office Action dated Feb. 8, 2018.
U.S. Appl. No. 15/340,022, filed Nov. 1, 2016, Non-Final Office Action dated Mar. 7, 2019.
U.S. Appl. No. 15/340,022, filed Nov. 1, 2016, Notice of Allowance dated Jul. 3, 2019.
U.S. Appl. No. 15/340,022, filed Nov. 1, 2016, Response to Non-Final Office Action dated Feb. 8, 2018.

* cited by examiner

WORKFLOW BASED COMMUNICATIONS ROUTING

CROSS-REFERENCE TO RELATED APPLICATIONS

This application claims the benefit of, and priority to, co-pending U.S. Non-Provisional patent application Ser. No. 15/340,022, entitled "WORKFLOW-BASED COMMUNICATIONS ROUTING," filed on Nov. 1, 2016, which is incorporated herein by reference in its entirety.

BACKGROUND

Service agents often interact with users to resolve user problems or issues. For example, a user may communicate with a service agent in order to change or cancel an order placed through an electronic commerce application. As another example, a user may communicate with a service agent in order to receive technical support. However, not every service agent is necessarily equally capable to resolve a customer issue. For example, some service agents may be experts or specialists in one field (e.g., technical support) but be unable to handle billing inquiries. As another example, some tasks may be satisfactorily performed using an automated system rather than relying on an employee.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for routing communications to an appropriate service agent based on a particular task that the user wishes to perform. The service agent can include a human being, such as trained customer service specialist or technical support specialist, or an automated program capable of executing a specific task (e.g., tracking a shipment; initiating a return, a refund, or an exchange of an item; etc.) while conversing with a user to obtain the information necessary to complete the task (e.g., asking for a tracking number, an order number, item number, etc.). Because the automated program is configured to communicate or "talk" with the user, it may be referred to as a "chat bot." Moreover, the automated program may be configured to initially communicate with the user in order to obtain information from the user and determine the user's reason for contacting customer service. After identifying the reason the user contacted customer service, the automated program may then route the user to either a human customer service agent or begin the automated process necessary to address the user's issue. Several examples of various embodiments of this functionality are illustrated in the following FIGS. 1A-C.

Figure 1A:
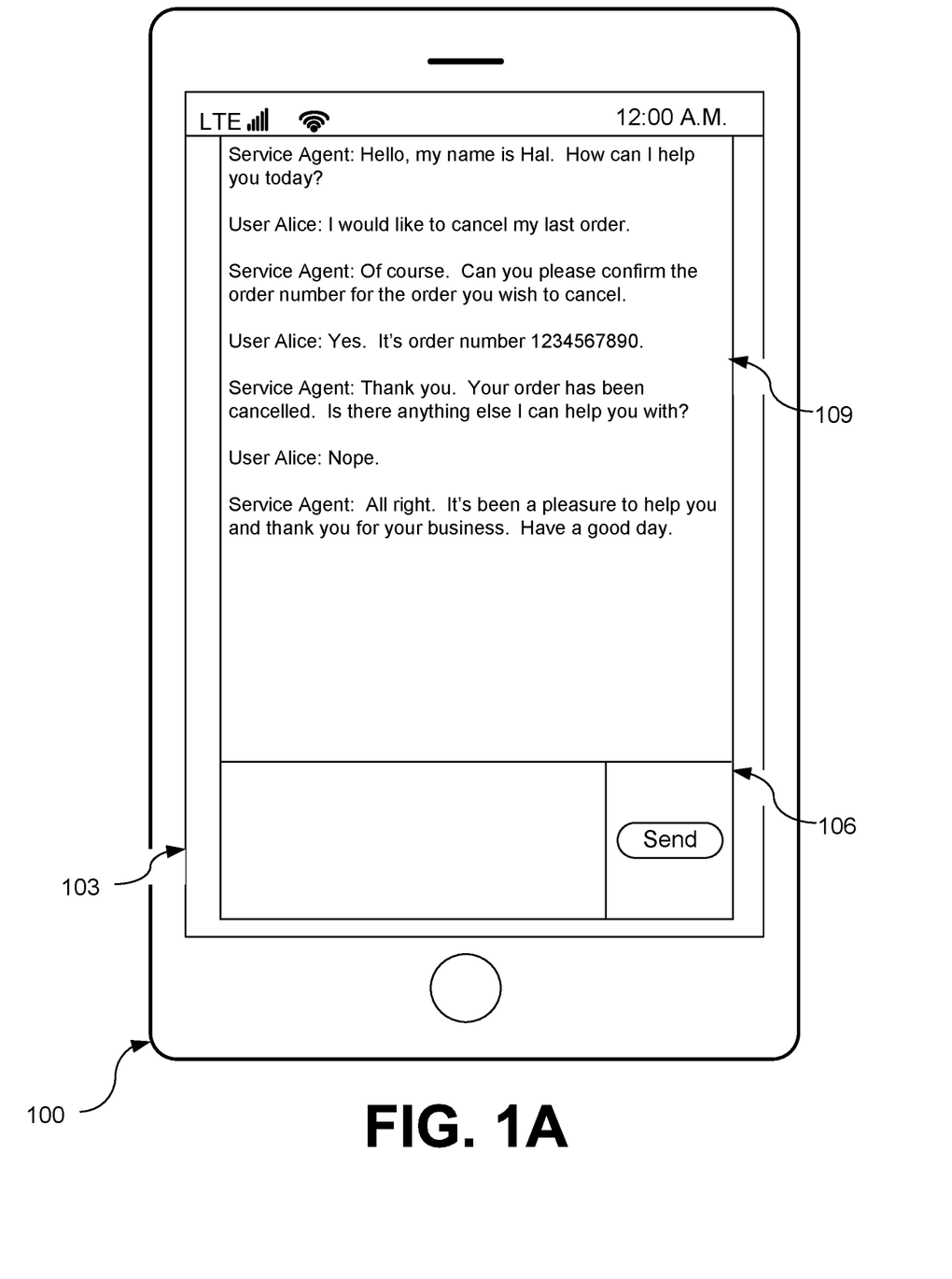
FIGS. 1A-1C are examples of a user's experience on a client device interacting with various implementations of the present disclosure.

With reference to FIG. 1A, shown is a client device 100. The client device 100 can be embodied in the form of a desktop computer, a laptop computer, mobile computing devices (e.g., smartphones, tablet computer systems, personal digital assistants, cellular telephones, music players, etc.), wearable computing devices (e.g., smartwatches, smart glasses, head-mounted displays, etc.), set-top boxes, game consoles, electronic book readers, or other devices with like capability. The client device 100 may include a display 103. The display 103 can include, for example, one or more devices such as liquid crystal displays (LCDs), gas plasma-based flat panel displays, organic light emitting diode (OLED) displays, electrophoretic ink (E-ink) displays, LCD projectors, or other types of display devices.

However, in some instances, the client device 100 may be configured to operate in a "headless" mode without a display. In these instances, the client device 100 can be operated using voice commands, hand gestures, or other interface. For example, voice commands can be received with a microphone and processed using a speech-to-text processor or application. Likewise, hand gestures can be recognized with a camera and processed using various approaches.

The client device 100 can be used to interact with various service agents. The service agents can include human operators or automated service agents (e.g., in the form of chat bots or similar applications). For example, a user interface 106 can be rendered or otherwise presented to a user. This can allow a user to electronically communicate with a service agent. For example, a user can use a messaging program to communicate with a service agent, in which case a transcript 109 can be rendered within the user interface 106. However, a user may also use the client device 100 to verbally communicate with the service agent. For example, the user may make a phone call or use a voice-over-internet-protocol ("VoIP") application to talk to the service agent.

In the example depicted FIG. 1A, as a user communicates with the service agent, a transcript 109 of the conversation is recorded. In embodiments that use automated service agents (e.g., chat bots), the responses of the service agent can be automatically generated through the use of a recurrent neural network trained on a plurality of transcripts 109. In some instances, a separate application can be executed to review the transcript 109 of the conversation between the user and the service agent in order to take an appropriate action based on a response provided by the service agent, as further described herein. In other instances, however, this functionality can be integrated into the chat bot.

Here, as the user "Alice" interacts with a chat bot or similar automated service agent, the chat bot determines the intent of Alice. As demonstrated in the example, Alice wishes to cancel her last order. In the background, the chat bot would determine the workflow corresponding to cancelling an order. In this example, cancelling an order can be processed automatically by the chat bot, so that chat bot continues to talk to Alice, asking for information like her order number for the order to be cancelled. The chat bot then cancels the order and thanks Alice for her business.

Figure 1B:
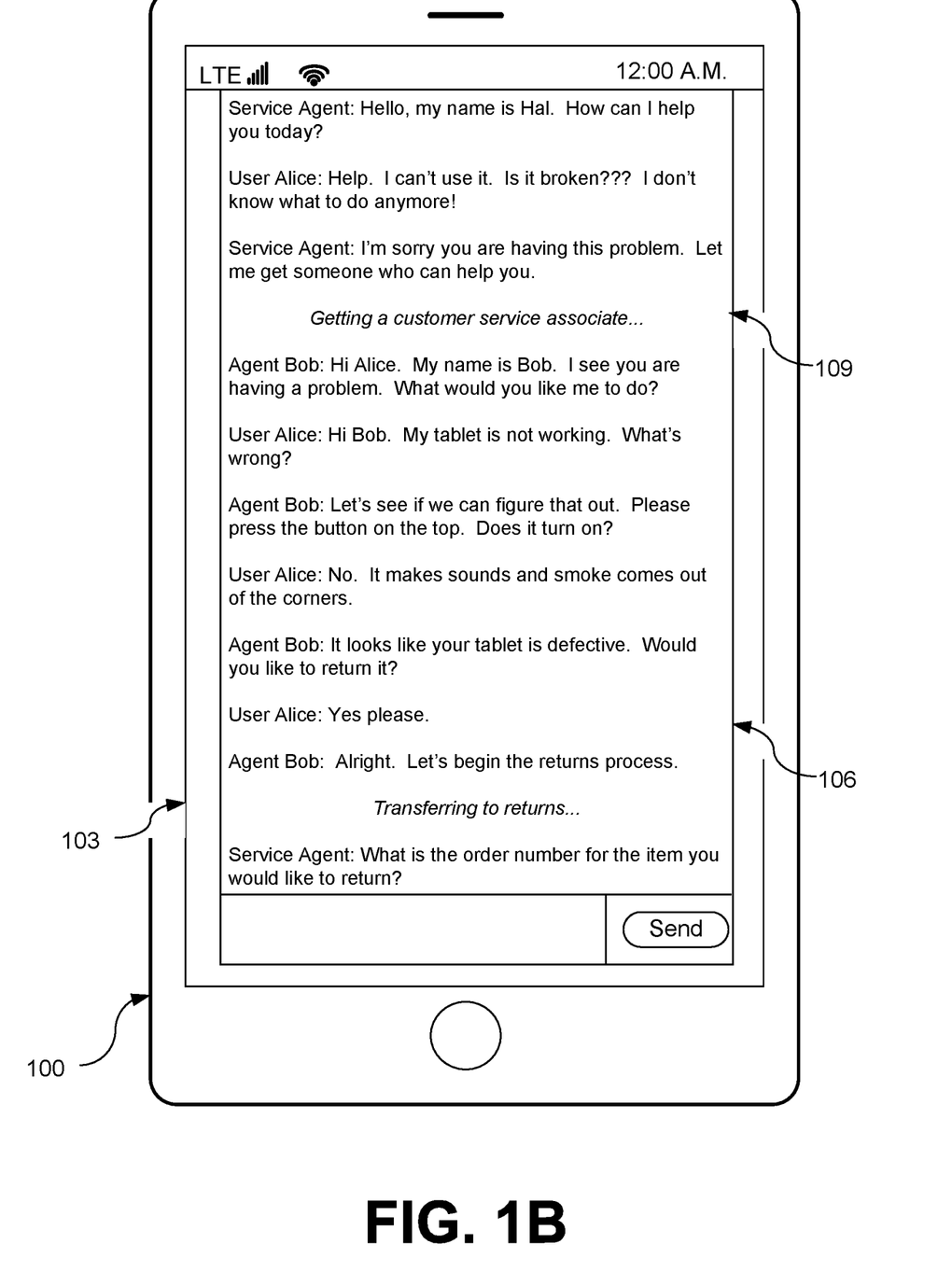

FIG. 1B depicts another example of a user's experience interacting with a chat bot or similar automated service agent program. In this example, a distraught Alice communicates with the automated service agent asking for help because something is broken. However, the automated service agent is unable to identify Alice's intent based on the limited information she has provided. Accordingly, the automated service agent transfers Alice to an employee—agent "Bob."

Bob converses with Alice. During the conversation, Bob is able to identify the problem (i.e., a broken tablet) and present Alice with a potential solution (i.e., return the tablet). Once Alice states she would like to return the tablet, the returns process is begun. In this example, since returns can be processed automatically, Alice is transferred back to the automated service agent to process the return.

Figure 1C:
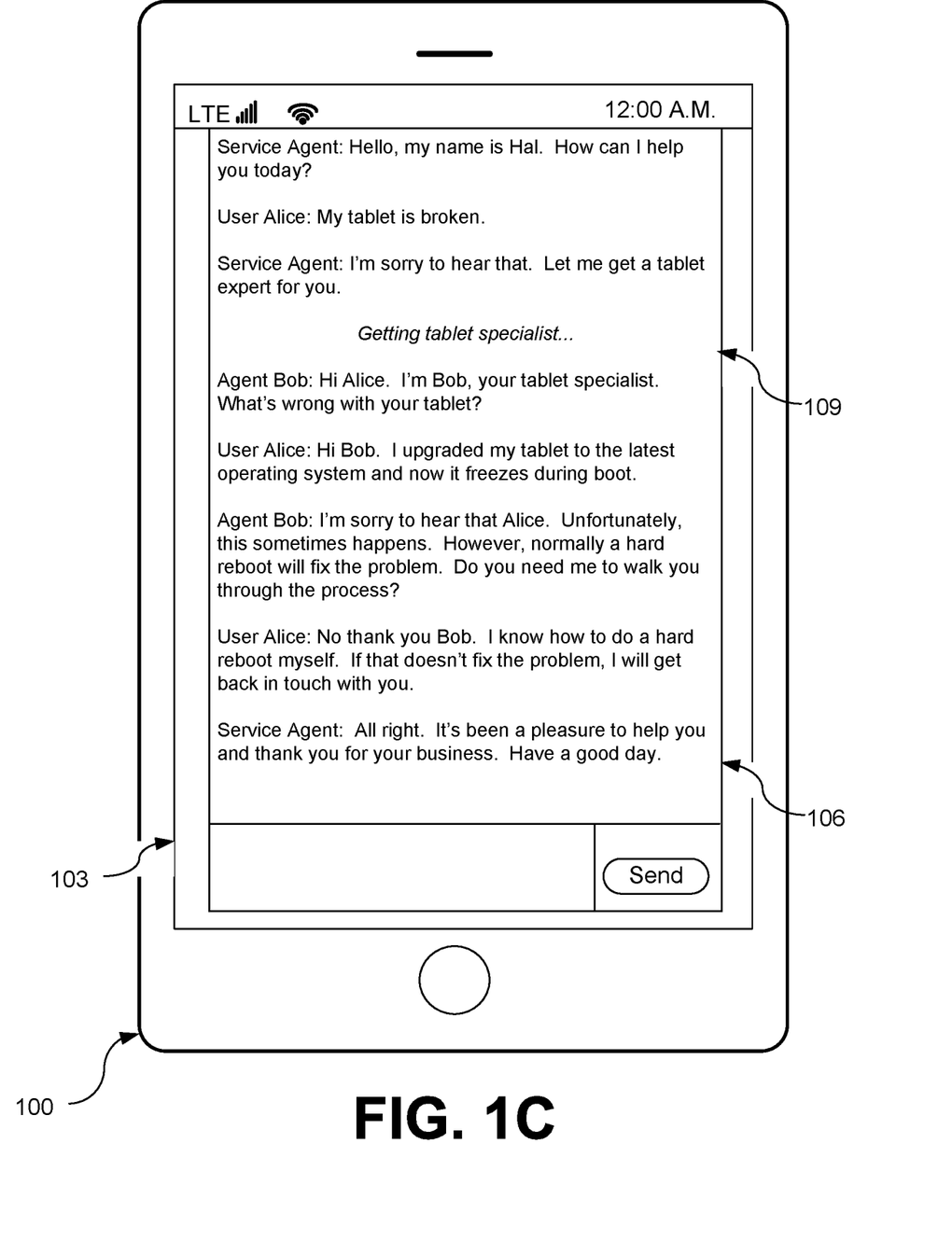

FIG. 1C depicts another example of a user's experience interacting with a chat bot or similar automated service agent program. In this example, a technically sophisticated user, Alice, has requested assistance with her tablet from the chat bot after encountering problems as a result of upgrading the operating system on her tablet. The chat bot, determining that Alice will want to speak with a technical specialist, transfers her to a tablet specialist Bob. Bob is able to suggest a solution to Alice, which she is familiar with performing. The chat bot determines that Alice does not need further assistance, and then seamlessly reroutes the conversation to itself to thank Alice.

Other embodiments of the user experience in various implementations of the present disclosure may include additional features. For example, while FIGS. 1A-1C depict that a user will be routed between service agents (e.g., between a customer service agent and a chat bot or vice versa), other implementations may allow the user to choose to be transferred. For instance, the user could be presented with prompt asking if the user would like to be transferred to another service agent. The user would, in these instances, be transferred if the user selected an option included in the prompt to be transferred.

Figure 2:
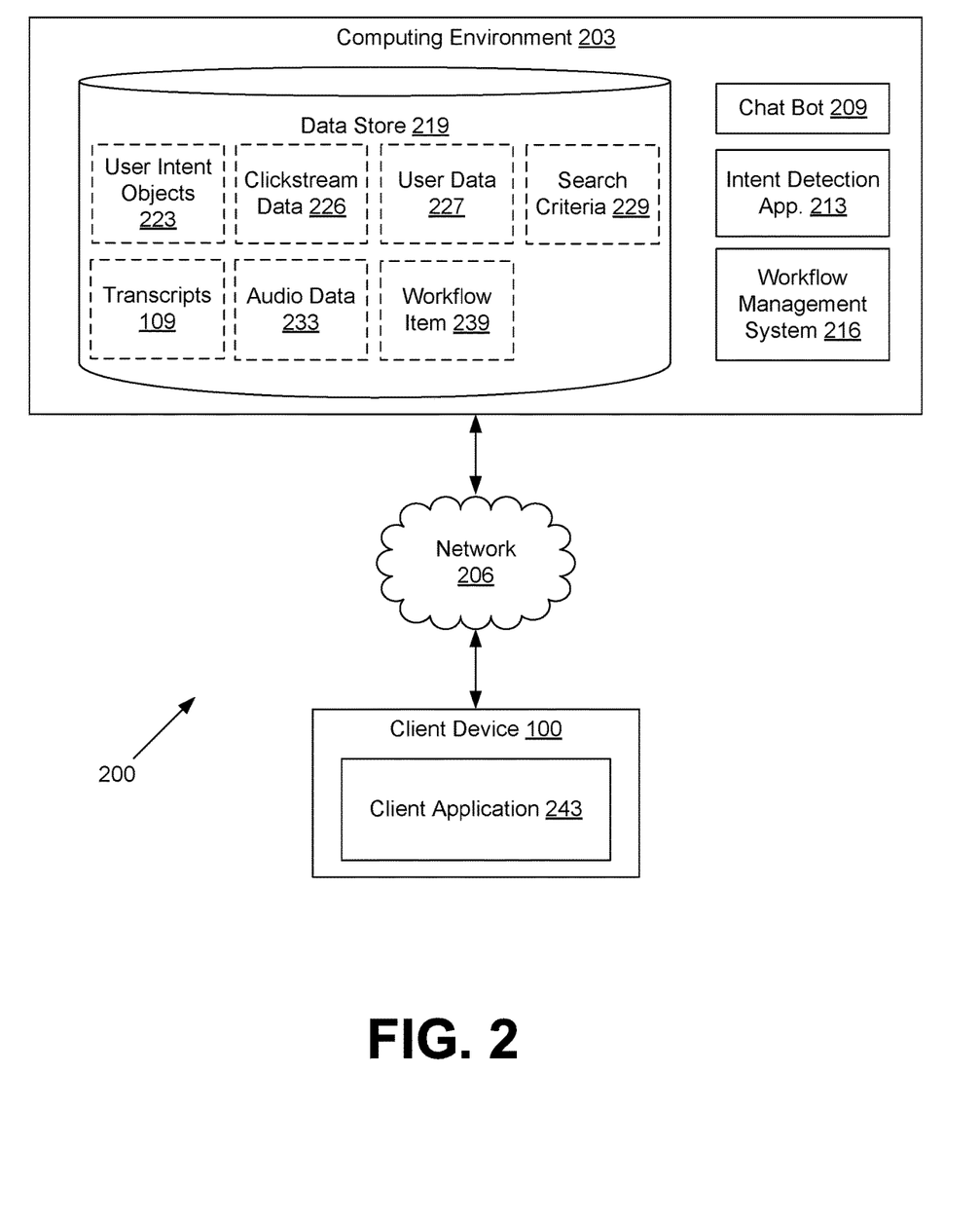
FIG. 2 is a drawing of a networked environment according to various embodiments of the present disclosure.

Moving on to FIG. 2, shown is a networked environment 200 according to various embodiments. The networked environment 200 includes a computing environment 203 and a client device 100, which are in data communication with each other via a network 206. The network 206 can include, for example, the Internet, intranets, extranets, wide area networks (WANs), local area networks (LANs), and various other network topologies. Accordingly, the network 206 can be configured using a wired network, a wireless network, or any combination of two or more such networks. For example, such networks can include satellite networks, cable networks, Ethernet networks, Wi-Fi networks, and other types of networks.

The computing environment 203 can include, for example, a server computer or any other system providing computing capability. Alternatively, the computing environment 203 may employ a plurality of computing devices that may be arranged in one or more server banks, computer banks, or other arrangements. Such computing devices may be located in a single installation or may be distributed among many different geographical locations. For example, the computing environment 203 may include a plurality of computing devices that together may include a hosted computing resource, a grid computing resource, or any other distributed computing arrangement. In some cases, the computing environment 203 may correspond to an elastic computing resource where the allotted capacity of processing, network, storage, or other computing-related resources varies over time.

Various applications or other functionality may be executed in the computing environment 203 according to various embodiments. The components executed on the computing environment 203, for example, include a chat bot 209, an intent detection application 213, and a workflow management system 216. Other applications, services, processes, systems, engines, or functionality not discussed in detail herein may also be executed in the computing environment 203.

Also, various data is stored in a data store 219 that is accessible to the computing environment 203. The data store 219 may be representative of a plurality of data stores 219. These data stores 219 could include relational databases, object object-oriented databases, hierarchical databases, key-value stores (e.g., hash tables, lookup-tables, etc.), and potentially other data stores. Further, the data stored in the data store 219 is associated with the operation of the various applications or functional entities described below. The data stored in the data store 219 includes, for example, user intent objects 223, clickstream data 226, user data 227, search criteria 229, transcripts 109, audio data 233, workflow items 239, and potentially other data.

The chat bot 209 is executed to communicate with a user of a client device 100 through various media. For example, the chat bot 209 can be configured to provide text responses to queries, requests, or instructions provided by a user (e.g., via electronic mail, a social media forum, a chat application, or similar messaging application). Examples of such configurations are illustrated in FIGS. 1A-C, which are discussed above. In another example, the chat bot 209 can include a voice synthesizer component that would allow the chat bot 209 to participate in a voice communication session with a user. For instance, the chat bot 209 could include a text-to-speech and a speech-to-text component in order to identify user requests or instructions and convert an appropriate response to a voice response.

In order to generate appropriate responses, the chat bot 209 can be configured to make use of a recurrent neural network to select an appropriate response when provided with a given input (e.g., a request, query, statement, or instruction from a user). The recurrent neural network can be provided with a plurality of transcripts 109 to train the recurrent neural network to respond in a particular manner to a specific statement or request from a user. However, other machine learning approaches can be used in other embodiments.

The intent detection application 213 is executed to analyze transcripts 109 of conversations between a service agent, which could include the chat bot 209 or a human agent, and one or more users to identify user intent objects 223. For example, where the service agent includes a chat bot 209, the intent detection application 213 can be executed to analyze a transcript 109 of a conversation between the chat bot 209 and a user. In some instances, the transcript 109 can correspond to a previous conversation between the chat bot 209 and a user, while in other instances, the transcript 109 can correspond to a current or on-going conversation between the chat bot 209 and the user. However, the intent detection application 213 can similarly be used to analyze transcripts 109 between a human service agent and a user. The intent detection application 213 can be further configured to select a workflow item 239 corresponding to the identified user intent object 223.

In some instances, the intent detection application 213 can be executed to detect a user changing from one user intent object 223 to another. For example, the intent detection application 213 could first detect from a transcript 109 that a user's user intent object 223 is to seek technical support for a recently purchased item. However, the intent detection application 213 could also be configured to monitor the ongoing conversation between the user and a technical support agent to determine that the user has changed his or her mind and wants to return the item because technical support is unable to fix it. In these instances, the intent detection application 213 can select a new workflow item 239 corresponding to the new user intent object 223 and send it to the workflow management system 216 to effectively reroute the user from the technical support agent to another service agent capable of handling returns.

The workflow management system 216 is executed to provide an infrastructure for the set-up, performance, and monitoring of a defined sequence of tasks, arranged as a workflow. The workflow can be represented as a workflow item 239. Accordingly, the workflow management system 216 can be configured to route specific tasks in a workflow to the appropriate service agent to perform the task, manage and resolve dependencies for individual tasks within a given workflow, assign priorities to individual workflows or tasks within a workflow, and other functions to facilitate completion of a given workflow. This could include routing a workflow to a chat bot 209, a human, or other entity.

The workflow management system 216 can also route a user between service agents in responses to changes in the workflow. In some instances, the workflow management system 216 can receive a notification from the intent detection application 213 that the current workflow item 239 is no longer appropriate because the user has changed his or her user intent object 223. In these instances, the workflow management system 216 can cancel the current workflow specified by the current workflow item 239, initiate a new workflow specified by a new workflow item 239, and reroute the user from the current service agent to a more appropriate service agent defined in the new workflow item 239.

The transcripts 109 represent individual transcripts of conversations that occur between one or more service agents, such as a chat bot 209 or a human customer service agent, and one or more users. Typically, the transcripts 109 will be stored in text form. This allows for transcripts 109 of written conversations between service agents and users (e.g., via email, social media, or messaging application) to be directly stored. Voice conversations (e.g., phone calls) can be converted to a text transcript using a speech-to-text converter or similar application.

A user intent object 223 represents one or more actions that a user wishes to perform. Any number of user intent objects 223 could apply for any individual embodiment of the present disclosure. For example, an electronic storefront can have user intent objects 223 representing customer intents such as cancelling a customer's order, modifying or changing a customer's order, issuing a refund, processing a return, updating a customer's information (e.g., address, billing information, etc.), or similar actions. As another example, a network site (e.g., a web site) could have user intent objects 223 representing user intents such as resetting a user's password, changing a user's username, updating a user's information, or similar actions. A technical support provider could have user intent objects 223 that correspond to users seeking help for common user problems (e.g., reboot a computer, restart an application, etc.).

Accordingly, each user intent object 223 can specify both the type of interaction a user wishes to have and the information that should be collected to address the user's intent. For example, if the user intent object 223 represents a user's desire to change an order, the user intent object 223 may specify that the order number or similar identifier is required, as well as the nature of the change to be made to the order (e.g., change to shipping address, change to items in order, change of delivery date, etc.). Depending on the nature of the change to be made to the order, the user intent object 223 may specify additional information that should be obtained from the user (e.g., identifier of item to be removed from or added to an order, new delivery address of order, etc.). As another example, if the user intent object 223 is to issue a refund-on-return for an item, the user intent object 223 may specify that an order identifier, an item identifier, a customer account, and a refund method (e.g. store credit/gift card, refund to credit card, etc.) be collected. Other user intent objects 223 may specify other types of information to be collected in order for the user's issue to be addressed.

In some instances, a user intent object 223 can also represent a lack of intent. This can allow for error handling in various situations. For example, if a user is confused when interacting with the chat bot 209 (e.g., fails to provide a response to the chat bot 209), a user's lack of interaction could be represented as a user intent object 223. Such a user intent object 223 could be used to initiate a process to assist the user or guide the user's interactions with the chat bot 209 or initiate an immediate transfer to a human service agent.

Additional data can be stored within a user intent object 223. For example, one or more workflow items 239 or identifiers of workflow items 239 could be stored within a user intent object 223. This allows for an application, such as the intent detection application 213, to initiate the correct workflow to address the intended action corresponding to the user intent object 223 by sending the appropriate workflow item 239 to the workflow management system 216. As another example, the user intent object 223 can, in some instances include one or more search criteria 229 or identifiers for search criteria 229, allowing for a user intent object 223 to be identified based on one or more search criteria 229 used to analyze a transcript 109.

In some instances, user intent objects 223 can be nested in a tree structure. For example, a root or parent user intent object 223 could represent a class of similar or related user intent objects 223, such as returning an item. The root or parent user intent object 223 could then have a number of leaf or child user intent objects 223 representing more specific actions, such as returning an item for a refund, returning an item for a replacement, etc.

The clickstream data 226 represents a recording or recordings of parts of a display that a user can interact with while using a software application. For example, the clickstream data 226 could record particular buttons that a user clicks on, keystrokes entered by a service agent, and similar data. This data could be collected as a user takes a particular action to resolve an issue (e.g., cancel an order, modify an order, issue a refund, process a return, reset or change a user's password, etc.) using a customer service application or portal. For instance, if a user selected a particular issue from a list of issues that the user was seeking to address, this data could be recorded as clickstream data 226.

The user data 227 represents data collected about individual users. This can include, for example, a history of previous orders and respective order statuses (e.g., delivered, expected delivery date, etc.). User data 227 can also include, for example, known or detected problems related to a user. For example, user data 227 could include information like whether a delivery is expected to be delayed or whether there was an error issuing a refund. These problems, for example, could be detected before a user even notices them (e.g., detecting a delivery delay in advance of a guaranteed delivery time for a user).

The search criteria 229 include various pattern matching expressions for matching a user intent object 223 to a transcript 109 or portion of the transcript 109. For example, a search criteria 229 could include a regular expression that represents a sequence of characters that defines a search pattern. The search pattern can be used in pattern matching with strings. Each search criteria 229, such as a regular expression, can be linked to a transcript 109 to a user intent object 223. If a string in a transcript 109 matches a search criteria 229, then the intent detection application 213 can determine that the linked user intent object 223 should be triggered.

The audio data 233 represents recordings of voice conversations between a user and a service agent, such as the chat bot 209 or a customer service representative. These voice conversations could correspond to phone calls between a user and a service agent. The audio data 233 for a conversation can be converted to a transcript 109 using a speech-to-text-converter or similar utility or application.

A workflow item 239 represents a task to be performed using the workflow management system 216. Accordingly, a workflow item 239 can include information such as the task to be performed, the service agent (e.g., chat bot or human agent) to be assigned to complete the task and/or communicate with the user, as well as any necessary subtasks to be completed in order to perform the task. The workflow item 239 may also correspond to an user intent object 223. For example, when the intent detection application 213 determines an user intent object 223 of a service agent based on a transcript 109, such as an user intent object 223 to cancel an order, the intent detection application 213 can cause a workflow item 239 for cancellation of the order to be created and processed by the workflow management system 216.

The client device 100 may be configured to execute various applications such as a client application 243 or other applications. The client application 243 may be executed in a client device 100, for example, to access network content served up by the computing environment 203 or other servers, thereby rendering a user interface 106 (FIG. 1A) on the display 103 (FIG. 1A). To this end, the client application 243 can include, for example, a browser, a messaging application (or similar communications application), a dedicated application, or other application. The user interface 106 can include a network page, an application screen, or other mechanism for interacting with or manipulating the client application 243 executing on the client device 100. The client device 100 may be configured to execute applications beyond the client application 243, such as email applications, social networking applications, word processors, spreadsheets, messaging applications, chat applications, or other applications.

Next, a general description of the operation of the various components of the networked environment 200 is provided. To begin, a user contacts the chat bot 209. For example, the user may interact with the chat bot 209 using a messaging application, an email application, a chat application, or other communications application on the client device 100. As another example, the user may use a telephone to call a number, where the call is routed to the chat bot 209. In this example, a speech-to-text application may be used to convert a user's verbal statements or questions into text that can be processed by the chat bot 209. Likewise, the chat bot 209 may supply responses to a text-to-speech application to convert text responses into a verbal response that can be supplied to the user via the telephone.

After contacting the chat bot 209, the user may have a conversation with the chat bot 209 to discuss and attempt to address or resolve an issue of the user. However, the chat bot 209 itself does not undertake any specific action to resolve the issue of the user. Instead, the intent detection application 213 can analyze a transcript 109 of the conversation between the chat bot 209 and the user to identify an appropriate user intent object 223. The analysis can include pattern matching (e.g. matching a text string within the transcript 109 with a second text string specified as a search criterion 229 within a user intent object 223), natural language processing, or other approaches. The intent detection application 213 can then extract any necessary information from the transcript 109 specified in the user intent object 223. After gathering the necessary information, the intent detection application 213 can send a request to the workflow management system 216 to process a workflow item 239 specified in the selected user intent object 223.

This separation of functionality between the chat bot 209 and the intent detection application 213 decouples the natural language processing of the chat bot 209 from the performance of actions to resolve a user's issue. Accordingly, refinements to the natural language processing abilities of the chat bot 209 would be less likely to impact the ability of the intent detection application 213 and the workflow management system 216 to identify and perform the tasks necessary to resolve a user's issue. However, in some embodiments, the chat bot 209 and the intent detection application 213 could be separate components of a single application.

Next, the workflow management system 216 can begin processing the workflow item 239. This can include routing particular tasks to complete the workflow item 239 to specific individuals or systems, monitoring the progress of the workflow item 239 as individual tasks are completed, and other functions. In some instances, the workflow management system 216 can cause a notification to be sent to the client device 100 of the user when the workflow item 239 corresponding to the user intent object 223 is completed.

In some instances, a user may continue to interact with a service agent while the workflow management system 216 processes the workflow defined in the workflow item 239 or after the workflow management system 216 processes the workflow defined in the workflow item 239. For instance, after a technical specialist processes a workflow assigned to the technical specialist for troubleshooting a user's client device 100, the user may decide to return the item for a replacement or refund. In these instances, the intent detection application 213 could detect the user's new intent from transcript 109 of the continuing conversation, select an appropriate user intent object 223, and assign a new workflow item 239 for processing a return to the workflow management system 216. In turn, the workflow management system 216 could potentially reroute the user to a new service agent for processing the return. For instance, the workflow management system 216 could reassign the user from the technical support specialist to the chat bot 209 in order to process the return.

Figure 3:
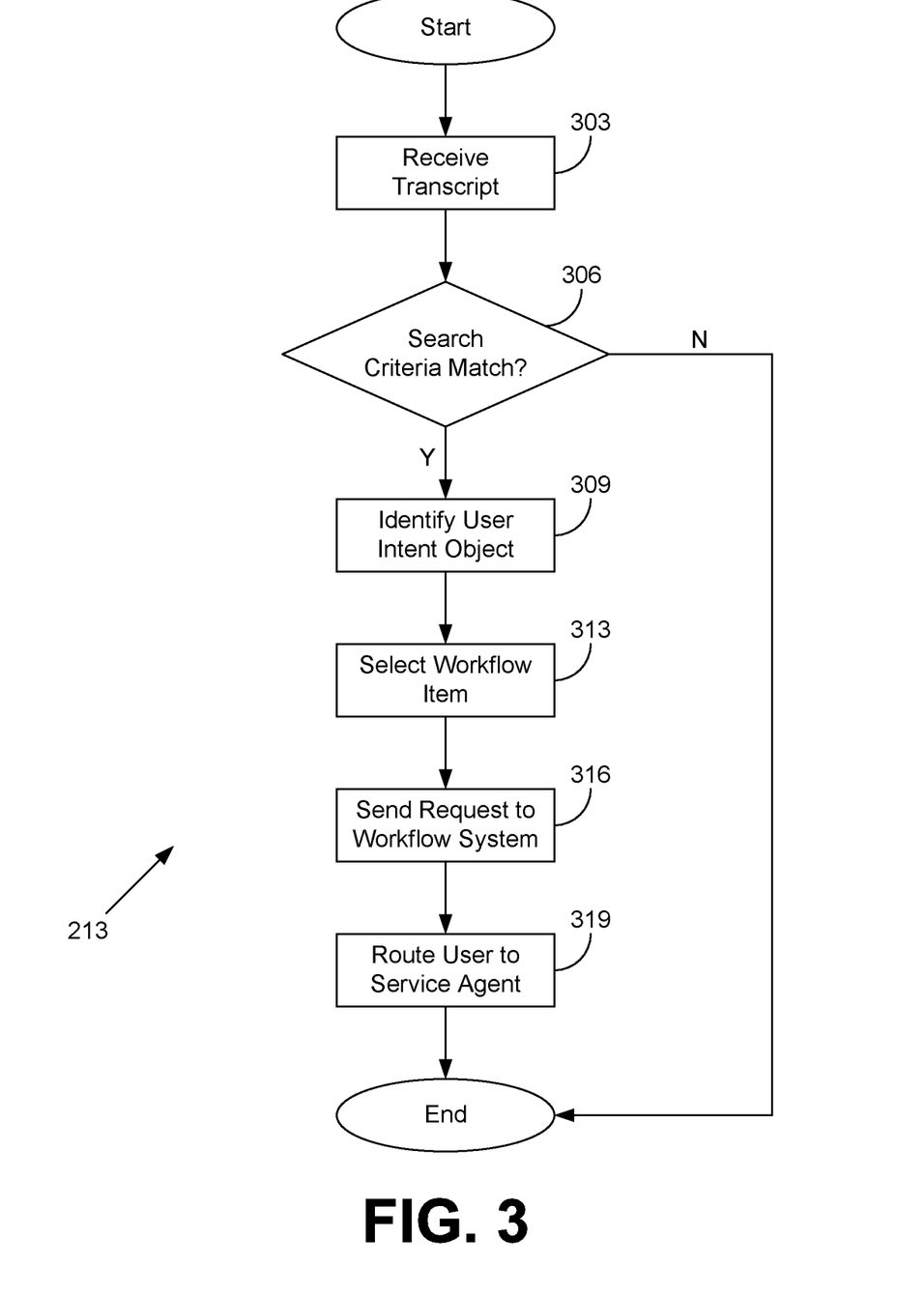
FIG. 3 is a flowchart illustrating one example of functionality implemented as portions of an application executed in a computing environment in the networked environment of FIG. 2 according to various embodiments of the present disclosure.

Referring next to FIG. 3, shown is a flowchart that provides one example of the operation of a portion of the intent detection application 213 according to various embodiments. It is understood that the flowchart of FIG. 3 provides merely an example of the many different types of functional arrangements that may be employed to implement the operation of the portion of the intent detection application 213 as described herein. As an alternative, the flowchart of FIG. 3 may be viewed as depicting an example of elements of a method implemented in the computing environment 203 (FIG. 2) according to one or more embodiments.

Beginning with box 303, the intent detection application 213 receives a transcript 109. The transcript 109 can be received from multiple sources. In some instances, the chat bot 209 (FIG. 2) can provide the transcript 109 to the intent detection application 213. For example, after a conversation with a user is completed, the chat bot 209 could provide the transcript 109 to the intent detection application 213 in order to identify the user's intended action. As another example, the chat bot 209 can provide a real-time transcript 109 as the corresponding conversation occurs. In this example, the chat bot 209 could provide updates to the transcript 109 as the conversation evolves. In other instances where a user converses with a human via a client application 243 (FIG. 2), such as a messaging application, the client application 243 could be configured to periodically provide the intent detection application 213 with a copy of the most recent version of the transcript 109 or updates to the transcript 109.

Moving on to box 306, the intent detection application 213 checks to see whether one or more search criteria 229 (FIG. 2), such as a regular expression, match a string within the transcript 109. In some instances, the intent detection application 213 may check each of the search criteria 229 stored in the data store 219 (FIG. 2). In other instances, the intent detection application 213 may only check a subset of the search criteria 229. If none of the search criteria match, then the process ends. Otherwise the process continues to box 309.

For example, the user intent detection application 213 may know, based on clickstream data 226 associated with the user, the general type of action that a user wishes to perform (e.g., return an item). For instance, the user may have clicked on a button or selected an option from a drop-down menu rendered in a user interface (e.g., a web page) that the user wanted to return an item. Accordingly, the user intent detection application 213 would only compare a subset of search criteria 229 corresponding to user intent objects 223 for specific types of return actions (e.g., return for refund, return for replacement item, etc.) to the transcript 109. If one of the search criteria 229 matches a text string in the transcript 109, then the process would continue to box 309.

Proceeding next to box 309, the intent detection application 213 identifies a user intent object 223 corresponding to the user's intent. For example, the intent detection application 213 can determine which user intent object 223 is linked to the search criterion 229 that matches the text string in the transcript 109. As another example, the intent detection application 213 can determine which user intent object 223 is most closely associated with the clickstream data 226 of the user. For instance, if the user initiated contact with the chat bot 209 after navigating through an order history or order status section of a website, the intent detection application 213 could select a user intent object 223 related to order status. As a third example, the intent detection application 213 can predict a user intent object 223 that will correspond to a user's intent based at least in part on user data 227 (FIG. 2). For example, if the user data 227 indicates that there was an error issuing a refund, the intent detection application 213 could predict that the user's intent will be to inquire on the status of the refund and select a corresponding user intent object 223.

Referring to box 313, the intent detection application 213 selects a workflow item 239 corresponding to the user intent object 223. For example, the intent detection application 213 can analyze, parse, or otherwise determine an identifier for a particular workflow item 239 listed in the user intent object 223. The intent detection application 213 can then select a matching workflow item 239.

Moving to box 316, the intent detection application 213 sends a request to the workflow management system 216 to process the selected workflow item 239 corresponding to the user intent object 223. In some instances, the request from the intent detection application 213 to create the workflow item 239 will also cause the workflow management system 216 to begin processing the workflow item 239. In other instances, the intent detection application 213 may separately request that the workflow management system 216 begin processing the workflow item 239 after it is created.

Proceeding to box 319, the intent detection application 213 can then route the user to an appropriate service agent that will process the workflow identified by the workflow item 239. For example, if the workflow item 239 indicates that a particular customer service representative should process the workflow to address the user's concerns, then the intent detection application 213 may connect the user to the customer service agent. Likewise, if the workflow item 239 indicates that the workflow can be processed automatically, the intent detection application 213 may connect the user to the chat bot 209 for additional service.

A user can be connected to a service agent in a number of ways. For example, if the user were communicating through the client application 243 (e.g., a dedicated messaging application, browser based messaging application, or a messaging feature of a larger application), the intent detection application 213 could cause the client application 243 to connect or otherwise route messages to the chat bot 209 or a second instance of the client application 243 executing on a client device operated by a customer service employee. As another example, the intent detection application 213 could initiate a phone call or other voice communication between the user and the service agent.

After the user is connected, the process subsequently ends. However, it should be noted that the previously described process can, in some instances, be performed periodically to confirm that the user's intent has not changed and, therefore, the appropriate workflow is still being processed and the user is still interacting with the appropriate service agent. For example, after a user has been routed to a first service agent, the user's intent may change as a result of interacting with the first service agent. Accordingly, the process of boxes 303-319 could be performed again using a transcript 109 of the conversation between the first service agent and the user to determine if the user's intent had changed. If so, a new user intent object 223 could be selected and a new workflow item 239 identified in order to process a new workflow and reroute or reconnect the user to a second service agent able to address the user's new concerns.

Figure 4:
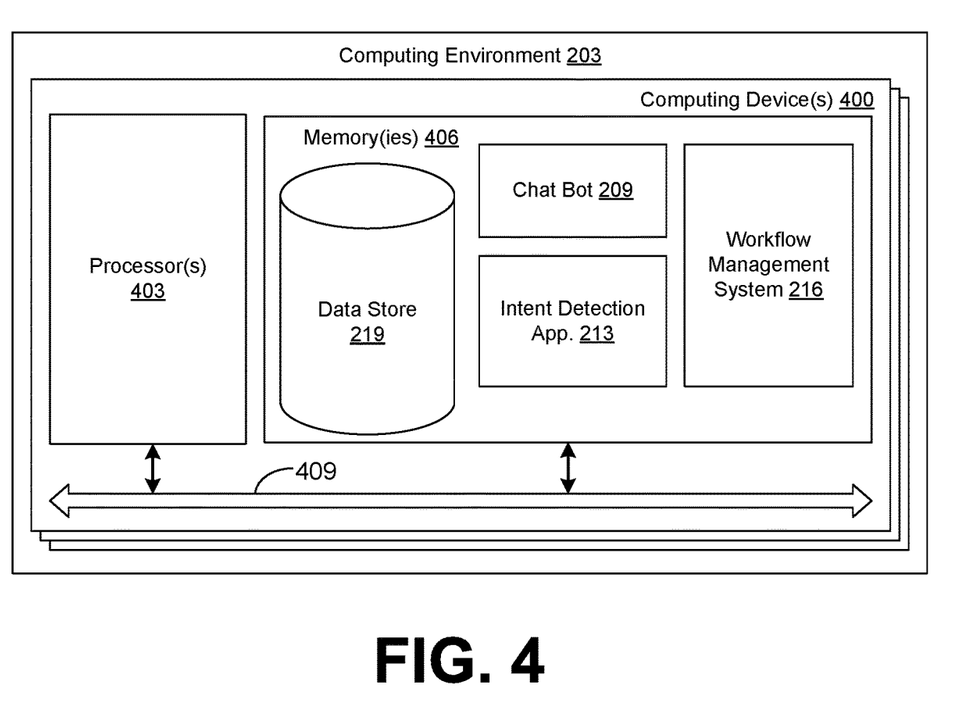
FIG. 4 is a schematic block diagram that provides one example illustration of a computing environment employed in the networked environment of FIG. 2 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 can include, for example, at least one server computer or like device. The local interface 409 can include, for example, a data bus with an accompanying address/control bus or other bus structure as can be appreciated.

Stored in the memory 406 are both data and several components that are executable by the processor 403. In particular, stored in the memory 406 and executable by the processor 403 are the chat bot 209, the intent detection application 213, the workflow management system 216, and potentially other applications. Also stored in the memory 406 may be a data store 219 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 can include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include, for example, static random access memory (SRAM), dynamic random access memory (DRAM), or magnetic random access memory (MRAM) and other such devices. The ROM can include, for example, a programmable read-only memory (PROM), an erasable programmable read-only memory (EPROM), an electrically erasable programmable read-only memory (EEPROM), or other like memory device.

Also, the processor 403 may represent multiple processors 403 or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 can include additional systems designed to coordinate this communication, including, for example, performing load balancing. The processor 403 may be of electrical or of some other available construction.

Although the chat bot 209, the intent detection application 213, the workflow management system 216, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the intent detection application 213. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the chat bot 209, the intent detection application 213, and the workflow management system 216, that includes software or code can be embodied in any non-transitory computer-readable medium for use by or in connection with an instruction execution system such as, for example, a processor 403 in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the chat bot 209, the intent detection application 213, the workflow management system 216, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
a first application comprising machine readable instructions stored in the memory that, when executed by the processor, cause the computing device to at least:
identify an association between a first text string in a first transcript and a user intent object based at least in part on an analysis of the first transcript, wherein the first transcript is generated from a first user conversation with a chat bot;
generate a search criteria for the user intent object that includes the first text string;
determine that a second text string in a second transcript matches the first text string specified by the search criteria, the second transcript being associated with a second user conversation with a second application;
identify a workflow item associated with the user intent object; and
process the workflow item specified by the user intent object.

2. The system of claim 1, wherein the search criteria comprises a plurality of text strings, and the first application further comprises machine readable instructions stored in the memory that, when executed by the processor, cause the computing device to at least:
identify a subset of the search criteria to use for searching for the user intent object in the second transcript based at least in part on clickstream data associated with a client device.

3. The system of claim 2, wherein the clickstream data comprises a plurality of previous user interactions with a website by the client device.

4. The system of claim 1, wherein processing the workflow item further comprises:
identifying a service agent for executing the workflow item based at least in part on the user intent object; and
routing a client device to the service agent.

5. A system, comprising:
a computing device comprising a processor and a memory; and
an application comprising machine readable instructions stored in the memory that, when executed by the processor, cause the computing device to at least:
determine an association between a text string in a first transcript and a user intent object, wherein the first transcript was generated from a first user conversation with a chat bot;
generate a search criteria for the user intent object that includes the text string;
identify the user intent object in a second transcript of a second user conversation with the chat bot based at least in part on applying the search criteria to the second transcript;
select a workflow item associated with the user intent object; and
process the workflow item specified by the user intent object.

6. The system of claim 5, wherein the application further comprises machine readable instructions stored in the memory that, when executed by the processor, cause the computing device to at least
determine additional information to collect during the second user conversation based at least in part on the user intent object.

7. The system of claim 5, wherein the search criteria comprises a plurality of text strings, and the application further comprises machine readable instructions stored in the memory that, when executed by the processor, cause the computing device to at least:
identify a subset of the search criteria to apply to the second transcript based at least in part on an interaction history of a client device of an user with a software application.

8. The system of claim 5, wherein processing the workflow item comprises routing a service agent to a respective client device associated with an user, wherein the service agent is specified by the workflow item.

9. The system of claim 5, wherein the workflow item further specifies a first portion of a workflow and a second portion of the workflow, the chat bot is designated to process the first portion of the workflow, and a human service agent designated to process the second portion of the workflow; and the application further comprises machine readable instructions stored in the memory that, when executed by the processor, cause the computing device to at least:
determine that the first portion of the workflow specified by the workflow item is complete; and
route a client device associated with the second user conversation from the chat bot to the human service agent specified by the workflow item in response to a determination that the first portion of the workflow is complete.

10. The system of claim 5, wherein the second transcript of the second user conversation is generated from at least one of: a message application, a chat application, or an email application.

11. The system of claim 5, wherein the user intent object is a first user intent object and the machine readable instructions that cause the computing device to identify the first user intent object in the second transcript further comprises machine readable instructions stored in the memory that, when executed by the processor, cause the computing device to at least:
identify a user interaction with a website by a client device;
determine that the user interaction falls within a class of user interactions corresponding to the first user intent object; and
identify a second user intent object that is a child object of the first user intent object based at least in part on the search criteria being applied to the second transcript.

12. The system of claim 5, wherein the search criteria comprises a regular expression.

13. The system of claim 5, wherein the chat bot is configured to operate as a portion of an automated service agent.

14. A method, comprising:
determining, with a computing device, an association between a first text string in a first transcript and a user intent object, wherein the first transcript is generated from a first user conversation with a chat bot;
storing, with the computing device, the first text string as a search criterion for the user intent object;
identifying, with the computing device, the user intent object in a second transcript of a second user conversation with the chat bot based at least in part on applying the search criterion to the second transcript;
selecting, with the computing device, a workflow item associated with the user intent object; and
processing, with the computing device, the workflow item specified by associated with the user intent object.

15. The method of claim 14, wherein processing the workflow item further comprises:
causing, with the computing device, the chat bot to request information associated with completing a task for the user intent object; and
in response to receiving a user response from a client device, processing, with the computing device, the task with the user response.

16. The method of claim 14, wherein the user intent object comprises a first user intent object, and processing the workflow item further comprises:
routing, with the computing device, a client device associated with the second user conversation to a first service agent capable of completing the workflow item; and
identifying, with the computing device, a change from the first user intent object to a second user intent object during a third user conversation with the first service agent.

17. The method of claim 16, wherein the workflow item comprises a first workflow item, and the method further comprises:
selecting a second workflow item associated with the second user intent object; and
routing the client device to a second service agent capable of completing the second workflow item.

18. The method of claim 16, wherein identifying the change from the first user intent object to the second user intent object is based at least in part on clickstream data generated by the first service agent.

19. The method of claim 14, wherein the search criterion comprises a plurality of pattern matching expressions.

20. The method of claim 14, wherein identifying the user intent object in the second transcript of the second user conversation is further based at least in part on user interaction with a network page by a client device.

* * * * *